March 27, 1962 H. A. PRICE 3,027,009
FILTRATION EQUIPMENT
Filed Jan. 28, 1959 4 Sheets-Sheet 1

FIG. 1

INVENTOR:
Harold A. Price

BY

ATTORNEY

March 27, 1962

H. A. PRICE

3,027,009

FILTRATION EQUIPMENT

Filed Jan. 28, 1959

INVENTOR:
Harold A. Price
BY
ATTY

March 27, 1962  H. A. PRICE  3,027,009
FILTRATION EQUIPMENT

Filed Jan. 28, 1959  4 Sheets-Sheet 4

*INVENTOR:*
Harold A. Price
BY
*Arthur Middleton*
ATTY

UNITED STATES PATENT OFFICE 3,027,009
Patented Mar. 27, 1962

3,027,009
FILTRATION EQUIPMENT
Harold A. Price, Lafayette, Calif., assignor to Permanent Filter Corporation, Los Angeles, Calif., a corporation of California
Filed Jan. 28, 1959, Ser. No. 789,682
3 Claims. (Cl. 210—236)

The present invention relates to a new and novel apparatus for filtering liquids, and more particularly to such apparatus which serves as a dirt remover and water-stripper for removing undesirable contaminants particularly in hydrocarbon fuels and the like used in aircraft.

The present invention represents an improvement over my co-pending application Serial No. 735,273, filed May 14, 1958.

That application describes an enclosed casing to which the filtrant is pressure-fed and the filtrate is emitted through one outlet and the contaminant is emitted through another. In the casing is a first apertured header plate toward which filtrant is directed and flows through the apertures each of which is in communication on the downstream side thereof with the interior of a filtering fabric sock for catching the coarser contaminants. Liquid passing through the socks is then directed to a subsequent and second apertured header plate and flows through the apertures with each of which is aligned a closed end cylinder of porous metal, preferably a matrix or lattice of sintered bronze spheres. In passing through the pores or interstices in the porous cylinder, the contaminant water particles suspended in the oil media are mutually repellant due to their charges of static electricity. This tends to prevent their coalescence but in passing through the porous metal cylindrical element, their charges seem to be neutralized and the dispersed water particles become docilized. The docilized water particles while in suspension in the fuel oil are then passed sequentially through blankets or mats of specially selected fiber glass whereupon the water particles are coalesced into drops large enough to settle by gravity in the fuel oil from whence they are removed. This treatment is successful not only in removing the dispersed water particles but also a significant proportion of the dissolved water.

Embodiments of the present invention are particularly suited for mounting upon a truck chassis such that it may be quickly and easily moved from place to place where it is desired to process fuel. An elongated casing is provided which is disposed substantially horizontally and has a longitudinally extending inlet tube disposed in the central portion of a cavity provided therein on which are mounted the two headers and the filtering elements they carry. A quick-opening closure means is provided at one end of the casing, and the open discharge end of the inlet tube is disposed adjacent this closure means.

A primary objective of the present invention is to provide an arrangement wherein various components of the device may be readily removed and replaced from time to time in order to clean or service the various parts. This is accomplished in a very effective manner in the present invention by providing a telescoping arrangement whereby the various components are slidably supported upon the inlet tube such that they may be merely slid out through the open end of the housing when the closure means is open. A first header supports the fabric socks and a second header member supports the filter units comprising the porous metal matrix surrounded by fiber glass mats. A novel feature of this invention comprises barrier means provided after the headers for purposes hereinafter set forth. Each of the headers and barriers is slidably supported by the inlet tube whereby each of these components may be removed in a very simple and effective manner. Another feature of this invention is the means also provided for assuring an efficient seal between these components when mounted in operative position.

A still further object of the present invention is to provide a filtering apparatus which is simple and inexpensive and compact in construction, is mobile, and yet is completely reliable and significantly efficient in operation.

Other objects and many attendant advantages of the invention will become more apparent when considered in connection with the accompanying specification and drawings, wherein.

Before describing the operaiton of embodiments of this invention, it may be helpful to mention details of the environment. For instance, it is generally conceded in the industry that hydrocarbon liquid fuels have the following water problems: in the hydrocarbon, there are as contaminants free water and emulsified water with the latter subdivided into light emulsions and stable emulsions. Free water is that normally represented by large free drops or sometimes layers such as found in tank bottoms. Emulsified water is that normally represented by water and oil that has been churned up by such devices as pumps into a liquid comprising very small droplets of water of either water with an oil skin or oil with a water skin, but in either case containing no solids. Light water emulsions or haze is that normally represented by extremely small or fine droplets of water dispersed throughout the hydrocarbon stream and formed by thermal differentials which cause the water that was in solution in the hydrocarbon (rocket fuel having a high solubility of water and jet fuels or other finished hydrocarbons having more receptability for water than gasolines) to be squeezed out upon temperature drop. This haze sometimes will disappear on a slight rise in temperature and will refuse to drop out even on long periods of tankage. Stable emulsions are those drops normally formed upon nucleii of dirt, oxide, or wax particles. These nucleii are quite often in a static charged state, or else the nucleii have a high molecular valence due to temperature variance. The latter may be explained by saying that the valence of an element is that property which is measured by the number of atoms of hydrogen (or its equivalent) one atom of that element can hold in combination if negative, or can displace if positive.

It has been found that if the liquid hydrocarbon is passed through a porous metal matrix of sintered bronze spheres, the statically charged contaminants of the hydrocarbon become neutralized or docilized, and thereafter if it is passed through the sequence of fiber glass formed as described herein, there is a size-propagating or size-augmenting action on the water droplets to make them grow in size until they are thereby made settleable in the hydrocarbon filtrate.

Accordingly, embodiments of this invention operate on the principle enunciated in my copending patent application Ser. No. 735,273 aforesaid by passing the filtrant through the porous hydrophobic porous metal matrix, these static charges can be neutralized, and the droplets thereby docilized by the matrix acting as a semiconductor, and second, by the molecular valence becoming stabilized by the holding action of the matrix, which slows the flow and thus allowing intimate contact with the metal while, at the same time, due to a slight pressure drop, the expended energy causes a slight drop in temperature and thereby permits a stabilizing effect to take place causing the emulsion to be easily broken up by taking advantage of the positive-negative charge change. Thus the matrix is made use of to accomplish this important effect, but additionally, it may be used as a preliminary conditioning zone through which the hydrocarbon liquid is passed on its way to treatment by the matrix, in which preliminary zone these charges are enhanced. It has been found that if they are so enhanced, the docilizing effect of the porous matrix seems to be increased. This static charge enhancing zone includes a plurality of sock-like elements through which the hydrocarbon is passed, and these socks are made of fabric woven of synthetic fibers that include such as those of nylon, Dacron, or Orlon, and under some conditions of glass. If the fabric is tufted or fibrillated, the effectiveness is increased over the use of smooth or slick fabric. The sock acts as a strainer in that it holds back some of the coarser dirt solids in the hydrocarbon filtrant from reaching the matrix.

A word now about the matrix. The most effective matrix seems to be one formed of sintered bronze spheres. The spheres were made of copper—about 90 percent—and about 10 percent tin coating the spheres. These spheres are sintered to the fusion point of the tin, and formed into a hard body in which the bronze spheres are in fixed mutual tangential contact. The spheres can be of a diameter of from 2 microns to 40 microns but the size used in one matrix should all be significantly the same to give uniformity of action. Irrespective of the sphere size used, the average void space is about 40 percent of the area. A sphere size of 10 microns is most used for removing water contaminant from oils used by aircraft. The pores or passages through the matrix can lie in a range of from 10 microns to 40 microns, depending on the character of the filtrant, but a range of from 20 microns to 30 microns seems to be the best. Sometimes the matrix will tend to become blinded and its capacity will thus drop off, so under such conditions it has proved satisfactory to add as much as 5 percent water to the filtrant since this seems to obviate what otherwise would be serious blinding. The added water seems to inject no serious problem because as it passes through the fiber glass blankets, their drop-size propagating power seems to condition the water easily to give it good settleability.

Referring now to the drawings, wherein like reference characters designate corresponding parts throughout the several views, an elongated closed-end body or casing means as indicated generally by reference numeral 10 is provided with an enclosed cavity 11 therein. An enlarged annular flange 12 is formed at one end of the casing and a quick-opening or quick-acting closure includes a central plug portion indicated generally by reference numeral 13 comprising an annular portion 14 having an outer surface 15 cooperating with an inner surface 16 formed on flange 12 for sealing the plug member with respect to the housing. The central portion 17 of plug member 13 is substantially dome-shaped and provides a hollow space therein for a purpose hereinafter described. Plug portion 13 is connected to arms 20 which are pivoted about a hinge pin 21 mounted between plates 22 and 23 fixed to the outer surface of the housing. A locking ring 25 is provided which seats within a cooperating groove 26 formed in the flange 12 and locks the closure means in operative position, a releasing mechanism 27 being provided for withdrawing the locking ring from the associated groove to enable opening of the closure means. This quick-acting closure means is disclosed in my copending U.S. patent application Ser. No. 754,037, filed August 8, 1958 and forms no part of the present invention. Other suitable types of quick opening closure means may also be employed at the open end of the casing 10.

Figure 2:
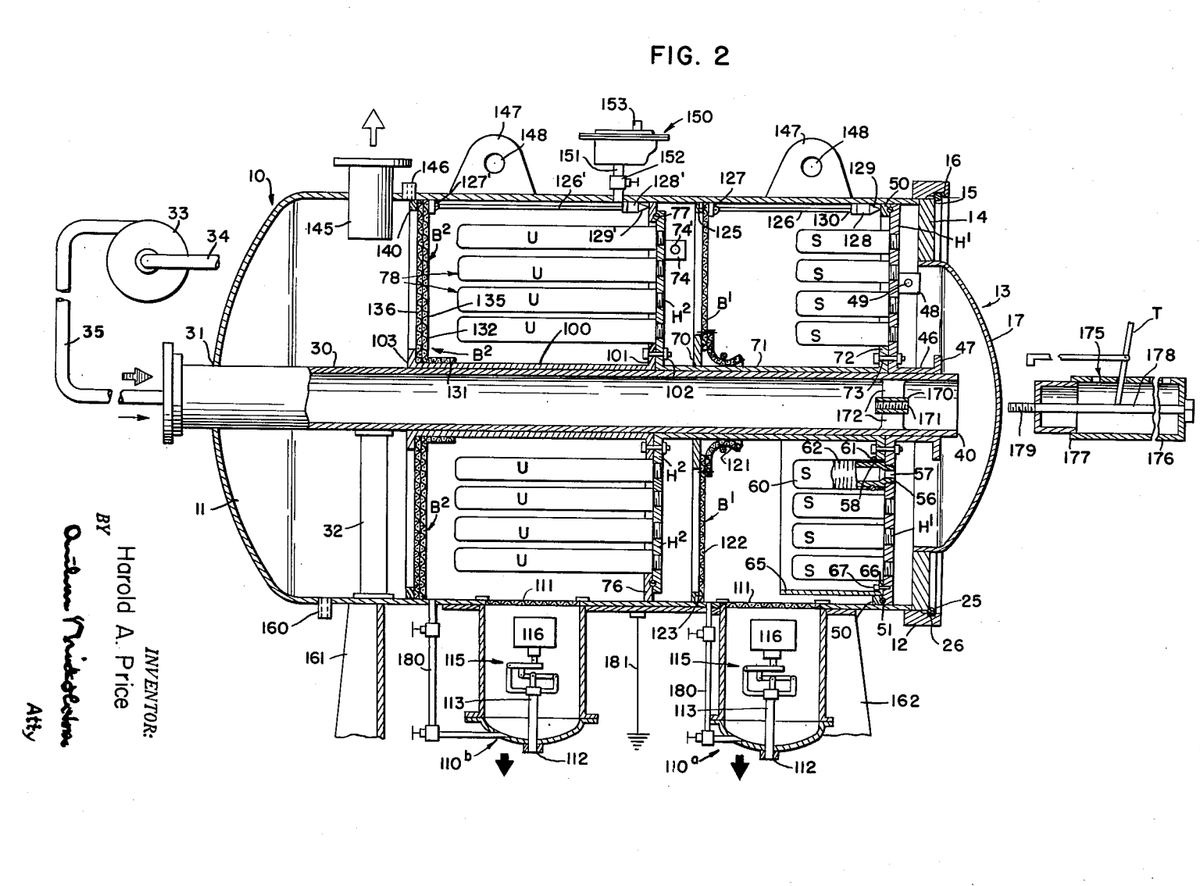
FIG. 2 is a longitudinal sectional view of the filter apparatus shown in FIG. 1.

An elongated inlet tube 30 projects securely through an opening 31 provided at the closed-end of the casing as seen most clearly in FIG. 2, an upstanding support means 32 extending between the bottom of the casing and the under surface of the inlet tube. A pump 33 is connected to a source of supply of the filtrant of hydrocarbon liquid such as fuel by means of a conduit 34, and a conduit means indicated schematically at 35 is connected with the inlet tube for pumping filtrant under pressure through the filter apparatus.

The inner end portion 40 of the inlet tube is open such that the filtrant pumped through the inlet means enters the cavity in the casing within the recess provided in the dome-shaped portion 17 of the closure means.

A first header member $H^1$ is of substantially disc-shaped configuration with an inner central opening fitted closely around inlet tube 30 such that the header member provides a seal with respect to the inlet tube and is slidable therealong. Header member $H^1$ is connected with a collar-like portion 46 extending toward the open end of the inlet tube and in surrounding relationship to the inlet tube. The end portion of collar-like portion 46 is provided with a pair of diametrically opposite lugs 47 adapted to be engaged for removing the header from the casing, and in addition, a lug 48 is formed integral with the face of header member $H^1$ and is provided with an opening 49 therein adapted to be engaged by a tool for facilitating withdrawal of the header member. The outer periphery of the header member is fitted against an annular shoulder or inwardly projecting flange 50 for providing a seal with respect to the casing, and an O ring 51 is seated within a suitable groove in the header and engages shoulder 50 for insuring a liquid-tight seal. It is evident that the liquid pressure in the casing tends to urge the header member $H^1$ into sealing engagement.

Figure 1:
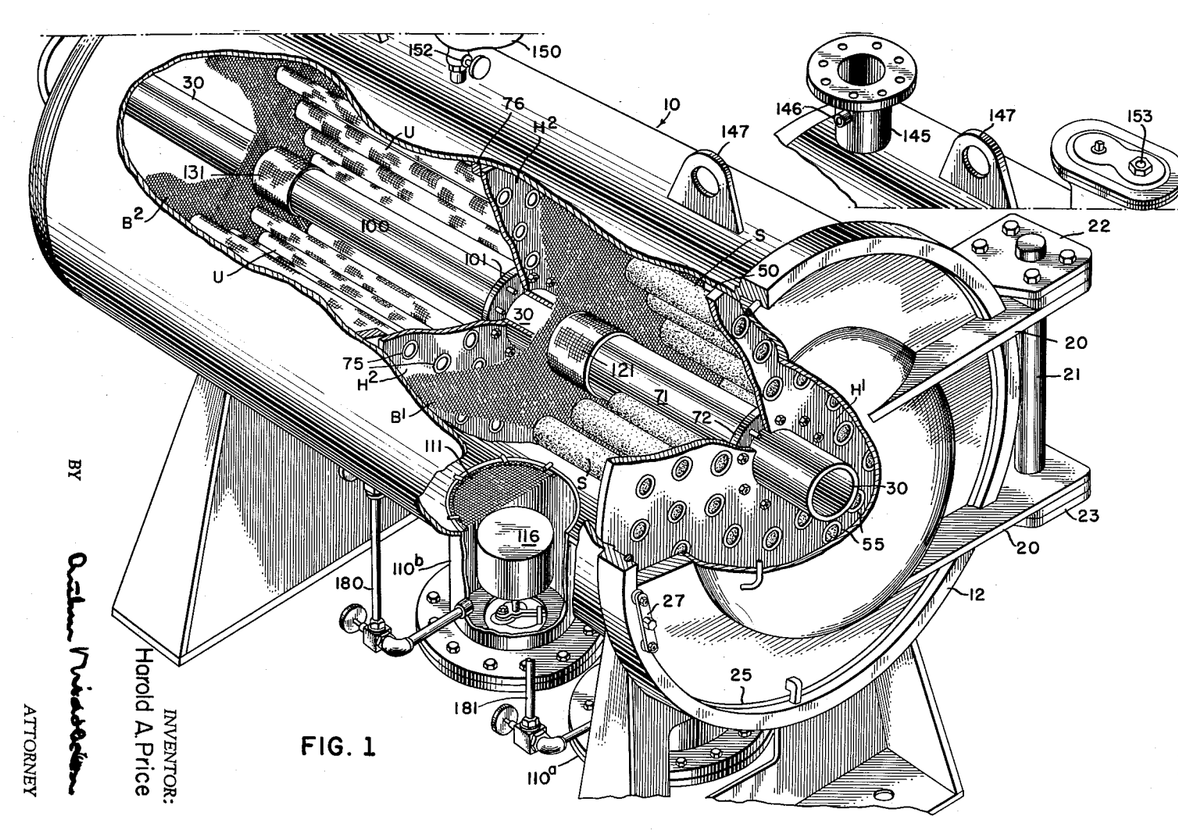
FIG. 1 is a perspective view partially cut away of a filter apparatus according to the present invention.

Header member $H^1$ is provided with a plurality of concentric rings of spaced openings or apertures 55 as seen most clearly in FIGS. 1 and 2 of the drawing. A fitting 56 is threaded within suitable threads provided in each of openings 55 and has a bore 57 therethrough and having a circumferential groove 58 formed in the outer surface of the end portion thereof. A closed-end sock S formed of fabric formed or woven of fibrous material surrounds each of the end portions of the fittings disposed in each of the apertures in header $H^1$, the socks being secured tightly to the fittings by means of annular sealing rings 61 forcing the sock members into the groove 58. A plurality of inwardly or upstream extending tufts or fibrillations 62 are provided on the inner surfaces of socks S for enhancing the electrostatic charge on the water particles and for collecting sludge thereon. It is apparent that the fittings 56 can be quickly and easily removed from header $H^1$, and the sock members S can be mounted and dismounted from the fittings in an expeditious manner merely by removing or applying the sealing rings 61 about the socks. The header $H^1$ and its socks comprise a first filtration stage.

Figure 3:
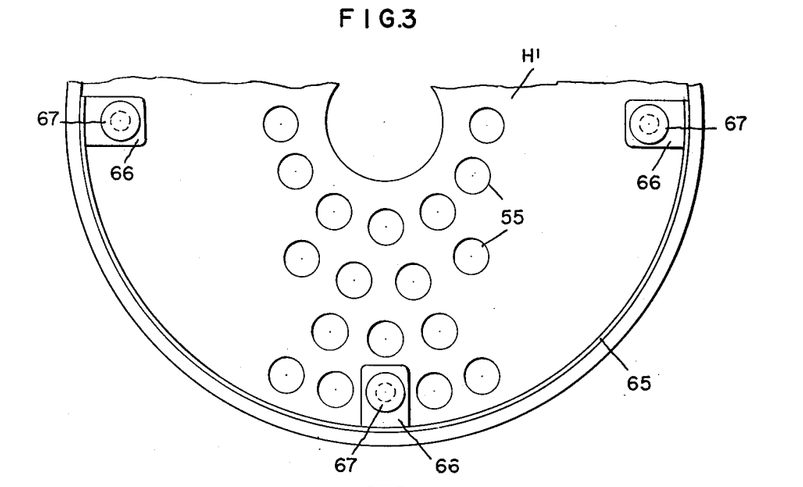
FIG. 3 is a view illustrating a portion of the first header member with the filter protective means attached thereto.

A guard means 65 for protecting the socks S upon insertion or removal of the header member $H^1$ from the housing as seen most clearly in FIG. 3 is substantially semi-cylindrical in configuration and is provided with several spaced inturned attaching flanges 66 which are secured by means of bolts 67 to header member 45. It is evident that upon insertion or removal of the socks, they will not be subjected to liquid pressure, and being of a fibrous fabric will tend to sag toward the bottom of the housing. Guard 65 prevents the socks from engaging the bottom of the casing. An additional sock guard may also be connected to the header at the portion disposed above the inlet tube for separately supporting the socks which are normally positioned above the central portion of the inlet tube.

A second header member H² is disposed in surrounding relationship and in sealing engagement with inlet 30 and yet is slidable with respect thereto. Header H² includes a tubular sleeve-like extension 71 disposed in surrounding relationship to the inlet tube, and an annular radially extending flange 72 is provided at the forward end of extension 71. A plurality of nut and bolt assemblies 73 extend through aligned openings provided in flange 72 and the inner portion of header 45 for securing the header member H¹ to the tubular extension 71 of header H². Sleeve-like extension 71 has an outwardly extending flange 70 for a reason given hereinafter. A lug 74 is formed integral with the face of header H² and is provided with a central opening 74′ adapted to be engaged by a suitable pulling tool. Header H² is small enough in diameter to be pulled out past shoulder 50 against which header H¹ normally seats.

Header member H² includes a plurality of openings or apertures 75 as seen most clearly in FIG. 1, which are disposed in a plurality of concentric circles through the disc-shaped header member. The outer periphery of header member H² is abutted against and in sealing relationship with an annular shoulder or inwardly extending flange 76 formed on the inner surface of the housing. An annular sealing ring 77 is disposed in a suitable groove provided in header member H² and engages shoulder 76 for insuring a fluid-tight seal. A plurality of closed-end porous metallic filtering units indicated generally by reference letter U are supported by or from header member H², one of the filtering units being alignedly disposed within each of the openings or apertures 75 in the header member.

Figure 4:
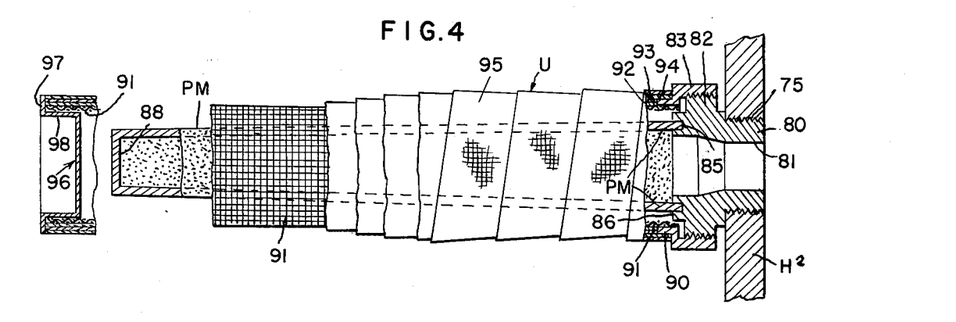
FIG. 4 is an enlarged longitudinal sectional view of a filter unit incorporated in the apparatus.
Figure 5:
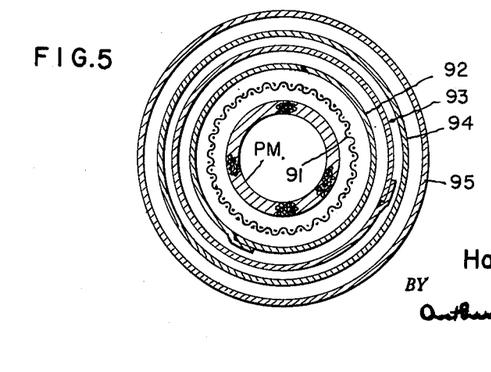
FIG. 5 is an exploded cross-sectional view of the device shown in FIG. 4 showing the interrelationship of the components thereof.
Figure 6:
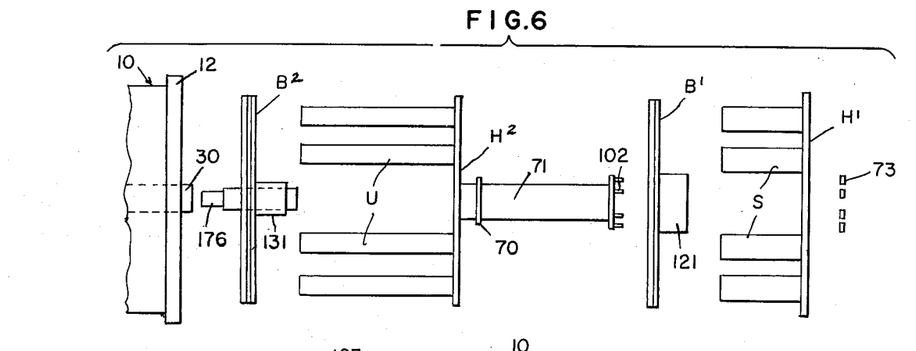
FIG. 6 is an exploded view of the casing and the order in which the various parts go into it and come out of it.

As seen most clearly in FIG. 4 of the drawings, a fitting 80 is threadedly mounted in each of the openings 75 which are provided with cooperating threads, fitting 80 having a central bore 81 extending therethrough. The outwardly extending flange 82 of fitting 80 is provided with threads on the exterior thereof, and a substantially annular collar 83 is threaded thereon.

An annular groove 85 is recessed into the outer surface 86 of fitting 80 and a porous metal filtering lattice or matrix PM such as of sintered bronze spheres of closed-end cylindrical configuration has the lower end thereof securely clamped within the groove. Porous metallic filtering unit or matrix PM extends outwardly and has a closed outer end 88 whereby it is apparent that fluid entering through bore 81 of fitting 80 will pass outwardly within the metallic matrix and thence outwardly through the porous walls thereof.

Collar 83 has an outwardly extending annular flange 90 which supports inwardly thereof a substantially cylindrical screen member 91 which provides an inner rigid support for the mat assembly according to the present invention. The three layers 92, 93 and 94 of the mat assembly are supported by screen 91 and extend outwardly in cylindrical concentric relationship with the matrix PM. A strip of fiber glass cloth 95 of open-weave is wrapped around the outer surface of layer 94 of the mat assembly for maintaining the mat assembly in proper position about screen 91, and yet is highly permeable by the filtrant. A cap 96 having an annular flange 97 is provided for maintaining the outer ends of the screen and layers of the mat assembly in proper spaced relationship with respect to one another by means of a downwardly projecting annular wall 98 defining a recess in the center thereof. It is apparent that each of the entire metallic filtering units shown in FIG. 4 including fitting 80 may be unscrewed from header 77 and removed bodily from the apparatus, thereby enabling a new filtering unit to be quickly inserted in place thereof. It is further apparent that collar 83 and the supported mat assembly may be in turn separately removed from the fitting 81 whereby a new mat assembly may be inserted on fitting 80 to cooperate with the porous metallic matrix PM supported thereby. Of course, the matrix itself may also be removed from fitting 80 and a new one inserted in place thereof. In this manner, a very flexible combined filtering and coalescing unit is provided whereby the various components thereof may be quickly and easily assembled and disassembled for cleaning or replacement, and yet the unit itself is very compact and sturdy in construction.

Where the matrix PM is to be used for holding back say 98 percent of all particles 10 microns in size and larger, the bronze spheres of the matrix can be sized as follows: 2 percent maximum having a diameter of plus 60 screen mesh; 55–85 percent plus 80 screen mesh; 10–35 percent plus 100 screen mesh; and 10 percent maximum plus 150 screen mesh with the starting spheres being about 90 percent copper with a tin coating of about 10 percent. If the matrix is for holding back, say 98 percent of all particles 20 microns in size or above, the matrix can be made up on such spheres of about 95 percent copper with a coating of about 5 percent tin, and the spheres used can be 1 percent maximum of plus 40 screen mesh, 98 percent minimum of plus 50 screen mesh; and 1 percent maximum of plus 60 screen mesh. If the matrix is for holding back say 98 percent of all particles 40 microns or larger, there should be used 3 percent maximum of plus 30 mesh; 95 percent minimum of 40 screen mesh; and 3 percent maximum of plus 50 screen mesh. The "plus" in the foregoing designates particles that will remain on the given sieve size.

The mat assembly has proven to be satisfactory when composed of three oleophilic and hydrophobic fiber glass blankets, the inner or upstream blanket which is first traversed by the filtrant serving to prevent passage therethrough of coarser particles while allowing contaminant water droplets in suspension to pass therethrough and while so passing being coalesced or having their drop-size augmented or enlarged. The intermediate blanket serves as a barrier to the passage therethrough of water drops smaller than a predetermined size. The third or downstream blanket is a second drop-size augmenting or propagating blanket similar to the first-mentioned blanket. These blankets or layers are each preferably formed of fiber glass such as is manufactured by Owens-Corning Glass Co., and the fibers thereof have provided satisfactory results when of the following characteristics: The inner or upstream and the outer or downstream blankets are constructed of unbonded "B" fibers having an average diameter of .00010 to .00015 inch. The intermediate blanket is constructed of unbonded "AA" fibers having an average diameter of .00003 to .00004 inch. The amounts of fiber glass used in the inner or upstream, the intermediate and the outer or downstream mats are respectively 14 grams+10 percent 15 grams+10 percent and 16 grams+10 percent.

The manner of docilizing and coalescing the water droplets in the fuel will now be discussed. As the liquid drops of water approach the porous bronze matrix, they are of different sizes and are provided with electro-static charges. As the water droplets pass through the matrix, the larger drops and solid particles are held back, and the electro-static charges are effectively neutralized by the action of the matrix in serving as a semi-conductor. The uncharged particles then pass through the first upstream layer 92 of the mat assembly, and as they pass through this layer some of the smaller water drops are forced to coalesce or unite with various other water drops to provide larger water drops as they emerge from the layer. The coalesced water drops then pass through the intermediate blanket or layer 93 of the mat assembly which serves as a barrier to the fine drops. The drops emerging from layer 93 are then forced through the third or downstream layer 94 of the mat assembly which serves as a further drop-size propagating medium such that the water drops which finally emerge from the mat assembly are large, smooth, depeptized water drops which will readily separate out from the surrounding filtrant due to the force of gravity. Solid particles of contaminants will often form a nucleus for a surrounding drop of liquid contaminant, whereby the solid and liquid contaminants will simultaneously settle out of the filtrant fuel.

A sleeve 100 is disposed in surrounding sealing relationship with respect to inlet tube 30 and is provided with an annular radially extending flange 101 at one end thereof. A plurality of nut and bolt assemblies 102 extend through aligned openings provided in flange 101 and the inner portion of header member $H^2$ securing the header member to sleeve 100. The rear end of sleeve 100 abuts against an annular shoulder 103 formed on the outer surface of inlet tube 30. The second header $H^2$ and its filtration units of combined porous metal and fiber glass blankets comprise a second filtration stage.

A pair of water-collecting sumps $110^a$ and $110^b$ are positioned at the lower portion of the casing, and have open upper ends which are in communication with the interior of the casing. Screen members 111 are mounted at the upper portion of the sumps, the solid contaminants and coalesced water drops passing through the screens 111 into the interior of the sumps. Screens 111 serve to minimize any foaming action which may tend to take place within the sumps. Each of the sumps is provided with an outlet 112 at the lower portion thereof, outlets 112 being open and closed by plungers 113 which are controlled by a double purchase lever construction indicated generally by reference numeral 115, the lever construction being actuated by a float 116. The lever and float construction are such that drain openings 112 will be periodically opened to release water which has accumulated in the sumps, and yet will insure that the drains are closed before any fuel could escape through the outlets, or in other words, the floats 116 are controlled by the level of water within the sumps.

It should be noted that the first one of the sumps is disposed below the filter socks S, and the other of the sumps is positioned below the metallic filter units U.

Figure 7:
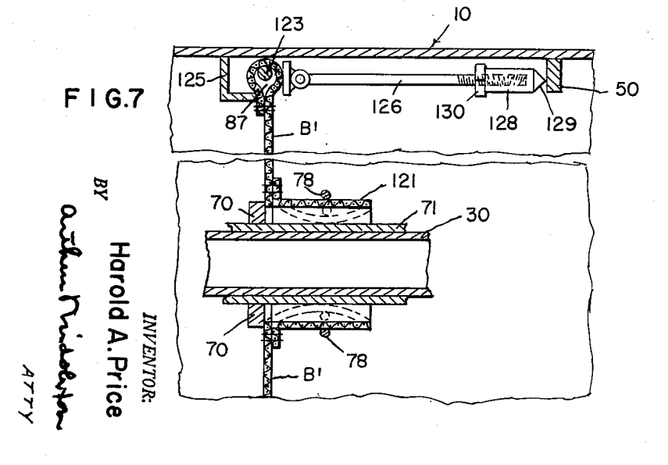
FIG. 7 is an enlarged detail in vertical cross section showing the barrier construction and the retractable jacks that hold them in place.
Figures 8A, 8B, 9:
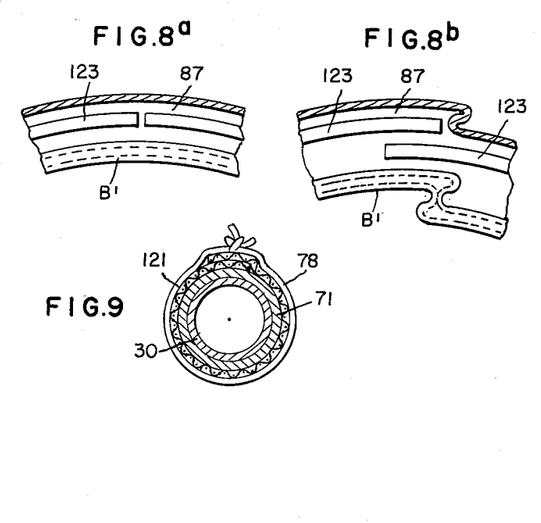
FIGS. 8a and 8b show how the periphery of the barriers is made compressible.
FIG. 9 is a vertical transverse section view through the neck-like hub portion of the barriers.

A primary selectively permeable barrier means $B^1$ is disposed downstream of socks S and upstream of metallic filter units U, and comprises an inner hub or neck portion 121 and a radially extending disc-like portion 122. Barrier $B^1$ is seated inwardly against flange 70 on sleeve 71. Hub portion 121 is large enough in diameter to slide over the flange 72 on sleeve 71 but being flexible may be somewhat collapsed and tied tightly around 71 as shown in FIG. 7 by cord 78. The hub portion may be slit so its parts can be overlapped as shown in FIG. 9, to fit against its tube more tightly. Hub portion 121 is preferably formed of nylon cloth and disc-like portion 122 is formed of a fiber glass screen which may be of 18 by 14 mesh for example or otherwise in size like insect screening. Hub portion 121 is secured to the fiber glass screen portion as the sewing or tying, and the outer periphery of the screen portion surrounded by a springy split-ring wire 123 which is sewn into a spacious outer peripheral pocket 87 in the screen. The fiber glass screen serves to prevent large particles of solid contaminant from passing into the metallic filter units U. An annular angle bar abutment 125 is formed on the inner surface of the casing, and the outer periphery of the primary barrier $B^1$ is urged into sealing relationship with this abutment by means of a plurality of retractable fasteners such as jacks 126, the rear ends 127 of which engage the outer periphery of the primary barrier $B^1$, and the forward ends of which are provided with a threaded head 128 (having a lock-nut 130) threadedly mounted on the end of the jack and provided with a pointed end portion 129 engaging the rear surface of shoulder or flange 50. It is apparent that by rotating head portion 128 of the jacks relative to the shank portions thereof, the primary barrier is firmly urged into sealing relationship with its associated abutment.

A secondary selectively permeable barrier indicated generally by $B^2$ also includes a hub or neck portion 131 and a disc-like radially extending portion 132. The hub portion and the disc-like portions each are formed of a pair of layers of material, the hub portion being sewn or tied to the disc-like portion. The double layer of material employed in the hub and disc-like protions comprises a first layer of fiber glass 135 disposed upstream of an abutting layer 136 of nylon material. The fiber glass employed in the secondary barrier may be of the type identified as fiber glass G-210-C manufactured by The National Filter Media Corporation, of New Haven, Connecticut. The nylon material may be of the type identified as NS 1228 also manufatured by The National Filter Media Corporation, of New Haven, Connecticut. This secondary barrier prevents the coalesced particles of water developed by the metallic filter units U from passing to the outlet of the mechanism, and insures that the coalesced particles of water will drop under the influence of gravity into water-colleging sump $110^b$ rather than being carried to the outlet by the filtrate flow through the apparatus.

Secondary barrier $B^2$ is maintained in operative position by a jack assembly identical with that employed in connection with the primary barrier, the jack employed with the secondary barrier being provided with the same reference numerals primed. The jack member associated with the secondary barrier urges the secondary barrier into sealing engagement with an annular abutment 140 similar to annular abutment 125 and secured to the inner surface of the casing. FIGS. $8^a$ and $8^b$ show how the diameter of the barriers, either $B^1$ or $B^2$ may have their circumference diminished or contracted for removing them from the filter casing by mis-aligning the ends of the wire 123.

An outlet 145 is provided intermediate the secondary barrier and the end of the housing through which filtrate passes outwardly of the apparatus to a suitable storage means. A pressure relief valve 146 of conventional construction is provided adjacent outlet 145 and is in communication with the interior of the housing for preventing an excessive pressure from being developed within the casing. A pair of legs 147 are each provided with a central opening 148, legs 147 being fixed to the upper surface of the housing for facilitating lifting and handling of the casing.

An air vent mechanism indicated generally by reference numeral 150 is supported by the upper surface of the casing and is in communication with the interior of the casing. Air vent mechanism 150 is of a conventional construction, including a float therein which is actuated by the liquid within the casing which passes upwardly through a conduit 151 which may be selectively closed by means of a valve 152. A vent 153 is open to atmosphere and is selectively closed by a member actuated by the float within the air vent means. As the liquid-level rises within the mechanism the float is actuated upwardly and closes vent 153, and when the liquid level drops down within mechanism 150, the vent 153 is again opened. This permits air to be exhausted from the casing when it is filled with liquid, and it also permits air to enter the casing when the vessel is being emptied of liquid. A drain 160 is provided at the lower portion of the casing and in communication with the interior thereof, the drain being controlled by a suitable plug means (not shown) such that the drain is ordinarily closed, and can be selectively opened to drain the liquid from the casing when desired. A pair of support members 161 and 162 are shown as supporting the lower surface of the casing, it being apparent that the casing could be supported in any desired manner. In addition, suitable valves would, of course, be provided in the conduits connected with the inlet and outlet means of the apparatus for controlling the flow of liquid through the filtering apparatus.

A support fitting 170 is provided adjacent the open end of inlet tube 30, fitting 170 being substantially cylindrical and having screw threads 171 formed upon the longitudinal bore thereof. A pair of streamlined supports 172 are connected to diametrically opposite portions of support 170 for maintaining the support in the central portion of the inlet tube, and yet permitting flow of fluid to pass this portion of the inlet tube. A tool supporting means indicated generally by reference numeral 175 includes a first open-ended cylinder 176 secured as by welding or the like to a second open-ended cylinder 177, an elongated bolt 178 being mounted within suitable openings provided in members 176 and 177 and projecting forwardly and having a threaded end portion 179. Threaded portion 179 is adapted to be threaded within the longitudinal bore 171 of support 170, and a portion 177 is adapted to fit snugly within the open end portion of the inlet tube 30. When so mounted, it is apparent that tool support means 175 in effect forms an extension of inlet tube 30, and serves as a means into which a suitable lever-bearing pulling tool T may be mounted for guiding the pulling tool outwardly from the casing and maintaining it in proper position relative thereto. The pulling tool may be of suitable construction for engaging the cooperating portions on the headers H¹ and H² for withdrawing the headers from the housing when the closure means is open.

It is evident that the first header H¹ and the second header H² as well as the primary and secondary barriers B¹ and B² together with the sleeve 100 are each slidably mounted with respect to one another and secured to one another in such a manner that they are telescoped upon the inlet tube 30 and can be successively removed therefrom and remounted in an inverse order. For example, header H¹ may be disconnected from flange 72 and removed from the casing. Primary barrier B¹ has its retractable jacks 126 removed and is then removed since its hub portion is large enough to clear the flange 72 on tube 30 and its periphery is compressible as shown in FIGS. 8ᵃ and 8ᵇ.

Header H² is next released from flange 101, and can pass outwardly beneath abutment 125 and shoulder 50 since its outer periphery is spaced inwardly thereof. Header H² with its sleeve extension 71 is then removed by sliding it along tube 30. And finally secondary barrier B² can then be removed for it is sufficiently flexible and compressible in its periphery (see FIGS. 8ᵃ and 8ᵇ) to pass beneath the shoulders and abutments 50, 76 and 125. It is evident that the components can be replaced within the apparatus merely by reversing this procedure. 180 represent sight gauge glasses to see how much water may be in the sumps 110ᵃ and 110ᵇ while 181 represents an electrical ground connection for the filter apparatus, which may be mounted on a motor-driven truck chassis. And the casing may be inclined downwardly at the right in FIG. 2, to cause water to flow toward the water-collecting sumps.

An important feature of the invention is the fact that since the header H¹ supporting socks S must be removed relatively often from the apparatus in order to clean or replace the socks, it is an easy procedure with the present construction because these components are mounted closely adjacent the casing closure means whereby they are readily accessible and can be removed without disturbing the remaining components of the apparatus.

The barriers B¹ and B² are important in their function of preventing passage therethrough of any coarser contaminants that may somehow have escaped the filtration assembly that precedes it. Moreover, there is a tendency of some coalesced water particles to bounce around after passing through the preceding filtration assembly, so the barrier tends to deflect such particles downwardly into the nearby water-collecting sump.

It is apparent from the foregoing that there is provided a new and novel filter apparatus which efficiently removes solid and liquid contaminant particles from liquids. A particular advantage of the construction according to the present invention is the manner in which the various components of the apparatus are mounted with respect to one another such as to permit quick and easy assembly and disassembly of the entire apparatus. The filter apparatus effectively coalesces water particles such that they readily settle out of the surrounding liquid, and the apparatus is quite simple and inexpensive and compact in construction, and yet is very reliable and efficient in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Filter apparatus for separating contaminants from a filtrant of fuel oil and the like comprising an elongated substantially horizontally disposed casing defining an enclosed cavity therein, closure means at one end of said cavity for gaining access to the casing, outlet means in communication with the cavity and disposed adjacent the opposite end of the casing, an imperforate inlet tube extending longitudinally within said casing and having an open end adjacent said closure means, means for forcing filtrant under pressure through said inlet means and through said cavity to pass out through said outlet means, a first perforated header means disposed in surrounding relationship to and slidably disposed upon said inlet tube, a plurality of socks formed of fabric woven from synthetic fibers supported by said first header means, one sock being aligned with each perforation in said first header means for receiving filtrant passing through the associated perforations, a second perforated header means disposed downstream of said first header means and upstream of said outlet means, a plurality of combination filtration and coalescing units supported by said second header means, one of said units being aligned with each of the perforations in said second header means for receiving filtrant therein, each of said units comprising a hollow closed-end porous hydrophobic matrix formed of sintered non-ferrous spheres for neutralizing static charges of water drops suspended in the filtrant passing therethrough, and a plurality of contacting filter-media blankets of fiberglass encircling and spaced from the matrix wherein the inner and outer blankets are water drop-size propagating while the middle blanket forms a size-selective barrier to the passage therethrough of water drops smaller than the selected size, said second header means including a tubular extension disposed in surrounding relationship to said inlet tube and having a radially extending annular flange at the outer end thereof, means for removably attaching said first header means to said annular means, a sleeve disposed in surrounding relationship to said inlet tube and being slidable thereon, said sleeve having a radially extending annular flange at one end thereof, means for removably attaching said second header means to said last-mentioned annular flange and a secondary barrier means supported by said sleeve in surrounding relationship thereto and downstream of said units and upstream of said outlet means, said secondary barrier means freely passing hydrocarbons therethrough, but preventing coalesced particles of water from passing therethrough.

2. Apparatus as defined in claim 1, wherein said secondary barrier means includes a disc-like portion extending substantially radially outwardly of said sleeve and comprising a layer of fiberglass, and a layer of nylon cloth disposed in abutting relationship to said layer of fiberglass and being disposed downstream of said layer of fiberglass.

3. Apparatus as defined in claim 2, including a primary barrier means supported in surrounding relationship to and slidable on said tubular extension, said primary barrier means including a disc-like portion extending substantially radially from said tubular extension and being formed of fiberglass screen and being disposed downstream of said socks and upstream of said units.

References Cited in the file of this patent

UNITED STATES PATENTS

| | | |
|---|---|---|
| 900,180 | Maggini | Oct. 6, 1908 |
| 1,093,684 | Campbell | Apr. 21, 1914 |
| 1,279,611 | Timmins | Sept. 24, 1918 |
| 1,430,950 | Crandall | Oct. 3, 1922 |
| 1,841,493 | McNulty | Jan. 19, 1932 |
| 2,079,755 | Wood | May 11, 1937 |
| 2,562,730 | Miller | July 31, 1951 |
| 2,667,273 | Gardes | Jan. 26, 1954 |
| 2,742,158 | Schuller | Apr. 17, 1956 |
| 2,747,739 | Bissonette | May 29, 1956 |
| 2,765,083 | Purmort | Oct. 2, 1956 |
| 2,781,909 | Thompson | Feb. 19, 1957 |
| 2,889,049 | Hauser | June 2, 1959 |

UNITED STATES PATENT OFFICE
CERTIFICATE OF CORRECTION

Patent No. 3,027,009                      March 27, 1962

Harold A. Price

It is hereby certified that error appears in the above numbered patent requiring correction and that the said Letters Patent should read as corrected below.

Column 7, line 62, for "the", first occurrence, read -- by --; column 8, line 12, for "protions" read -- portions --; line 16, for "G-210-C" read -- G-201-C --.

Signed and sealed this 21st day of August 1962.

(SEAL)
Attest:

ESTON G. JOHNSON

Attesting Officer

DAVID L. LADD
Commissioner of Patents